(12) United States Patent
Cotten et al.

(10) Patent No.: US 9,988,866 B2
(45) Date of Patent: Jun. 5, 2018

(54) AUTOMATIC CHOKE OPTIMIZATION AND SELECTION FOR MANAGED PRESSURE DRILLING

(71) Applicant: HALLIBURTON ENERGY SERVICES, INC., Houston, TX (US)

(72) Inventors: Nancy Suzan Cotten, Glen Rose, TX (US); Eric Miller, Argyle, TX (US); Charles Michael Pool, Bedford, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 179 days.

(21) Appl. No.: 14/781,967

(22) PCT Filed: Dec. 12, 2014

(86) PCT No.: PCT/US2014/070014
§ 371 (c)(1),
(2) Date: Oct. 2, 2015

(87) PCT Pub. No.: WO2016/093859
PCT Pub. Date: Jun. 16, 2016

(65) Prior Publication Data
US 2016/0298401 A1    Oct. 13, 2016

(51) Int. Cl.
*E21B 21/08* (2006.01)
*E21B 21/10* (2006.01)
(Continued)

(52) U.S. Cl.
CPC ............ *E21B 21/106* (2013.01); *E21B 21/08* (2013.01); *E21B 34/02* (2013.01); *E21B 44/00* (2013.01);
(Continued)

(58) Field of Classification Search
CPC ........ E21B 21/08; E21B 21/106; E21B 34/02; E21B 44/00; G05B 19/05
See application file for complete search history.

(56) References Cited

U.S. PATENT DOCUMENTS 3,362,487 A    1/1968  Lindsey
3,429,385 A    2/1969  Baugh et al.
(Continued)

FOREIGN PATENT DOCUMENTS

EP    1048819    11/2000
WO    9947788    9/1999
(Continued)

OTHER PUBLICATIONS

Dosunmu et al., "Managed Pressure Drilling with Automatic Choke Control in Low Pressure Reservoir", Jul. 2011, 17 pages.
(Continued)

*Primary Examiner* — Matthew R Buck
(74) *Attorney, Agent, or Firm* — Kilpatrick Townsend & Stockton LLP

(57) ABSTRACT

A choke valve assembly, system, and method can be used with a drill string in a wellbore to aid in controlling the bottom hole pressure during drilling of the wellbore. The choke valve assembly can have a primary choke and one or more supplemental chokes, where these choke valves each have a controllable range relative to the flow and pressure of drilling fluid passing through the assembly. A control unit can automatically actuate the primary choke and one or more supplemental chokes in order to both maintain the choke valves within their controllable ranges and concurrently maintain a consistent boom hole pressure in the connected wellbore.

26 Claims, 8 Drawing Sheets

(51) Int. Cl.
*E21B 44/00* (2006.01)
*E21B 34/02* (2006.01)
*G05B 19/05* (2006.01)

(52) U.S. Cl.
CPC .... *G05B 19/05* (2013.01); *G05B 2219/13095* (2013.01)

(56) References Cited

U.S. PATENT DOCUMENTS

| | | | |
|---|---|---|---|
| 4,630,675 | A | 12/1986 | Neipling et al. |
| 6,484,816 | B1 | 11/2002 | Koederitz et al. |
| 6,575,244 | B2 | 6/2003 | Chang et al. |
| 6,612,547 | B2 | 9/2003 | Murray et al. |
| 7,207,399 | B2 | 4/2007 | Duhe et al. |
| 7,407,019 | B2 | 8/2008 | Kinder et al. |
| 8,033,335 | B2 | 10/2011 | Orbell et al. |
| 8,122,975 | B2 | 2/2012 | Schmigel et al. |
| 8,281,875 | B2 | 10/2012 | Lovorn et al. |
| 8,347,983 | B2 | 1/2013 | Hoyer et al. |
| 8,490,719 | B2 | 7/2013 | Duhe et al. |
| 2005/0092523 | A1 | 5/2005 | McCaskill et al. |
| 2005/0222772 | A1 | 10/2005 | Koederitz et al. |
| 2006/0086538 | A1 | 4/2006 | Van et al. |
| 2006/0278399 | A1 | 12/2006 | Dwivedi et al. |
| 2009/0236144 | A1 | 9/2009 | Todd et al. |
| 2010/0006299 | A1 | 1/2010 | Meng et al. |
| 2012/0241217 | A1 | 9/2012 | Davis et al. |
| 2012/0255776 | A1 | 10/2012 | Knudsen et al. |
| 2013/0133948 | A1 | 5/2013 | Lovorn et al. |
| 2014/0138094 | A1 | 5/2014 | Hannegan et al. |
| 2016/0102511 | A1* | 4/2016 | Brana ............... E21B 7/00 175/25 |
| 2016/0138351 | A1* | 5/2016 | Dillard ............ E21B 21/08 175/25 |

FOREIGN PATENT DOCUMENTS

| | | |
|---|---|---|
| WO | 0131167 | 5/2001 |
| WO | 2007141386 | 12/2007 |
| WO | 2013090660 | 6/2013 |
| WO | 2014007797 | 1/2014 |

OTHER PUBLICATIONS

Liu et al., "Modeling the Pressure Characteristics of Parallel Chokes Used in Managed Pressure Drilling and Related Experiments", Sep. 2012, 5 pages.

International Patent Application No. PCT/US2014/070014, International Search Report and Written Opinion, dated Aug. 19, 2015, 21 pages.

* cited by examiner

AUTOMATIC CHOKE OPTIMIZATION AND SELECTION FOR MANAGED PRESSURE DRILLING

CROSS-REFERENCE TO RELATED APPLICATIONS

This is a U.S. national phase under 35 U.S.C. 371 of International Patent Application No. PCT/US2014/070014, titled "AUTOMATIC CHOKE OPTIMIZATION AND SELECTION FOR MANAGED PRESSURE DRILLING" and filed Dec. 12, 2014, the entirety of which is incorporated herein by reference.

TECHNICAL FIELD

This disclosure relates to apparatus and systems using controllable fluid choke systems in hydrocarbon wells and other wells and the managed pressure drilling thereof.

BACKGROUND

In the managed pressure drilling (MPD) of wellbore or reservoir fluidic systems, a choke valve can be used to regulate fluid flow and fluid pressure through tubing. Choke valves have an operational range, beyond which the choke valve may not be able to regulate fluid flow or fluid pressure. Multiple choke valves can be used to increase or decrease either or both of fluid flow and fluid pressure, which is generally accomplished in the industry through manual control by an operator. Traditionally, adjustment of choke valves is based on a trend analysis of general flow characteristics in the choke valves, which can be a lagging indicator of the status of the fluidic system, and slow to react to extreme flow events such as spikes in pressure or flow speed.

BRIEF DESCRIPTION OF THE DRAWINGS

Illustrative aspects of the present disclosure are described in detail below with reference to the following drawing figures.

FIG. 3-1 is a schematic diagram of a computing device that can operate as a control unit for a choke valve system, according to some aspects of the present disclosure.

DETAILED DESCRIPTION

Figure 1A:
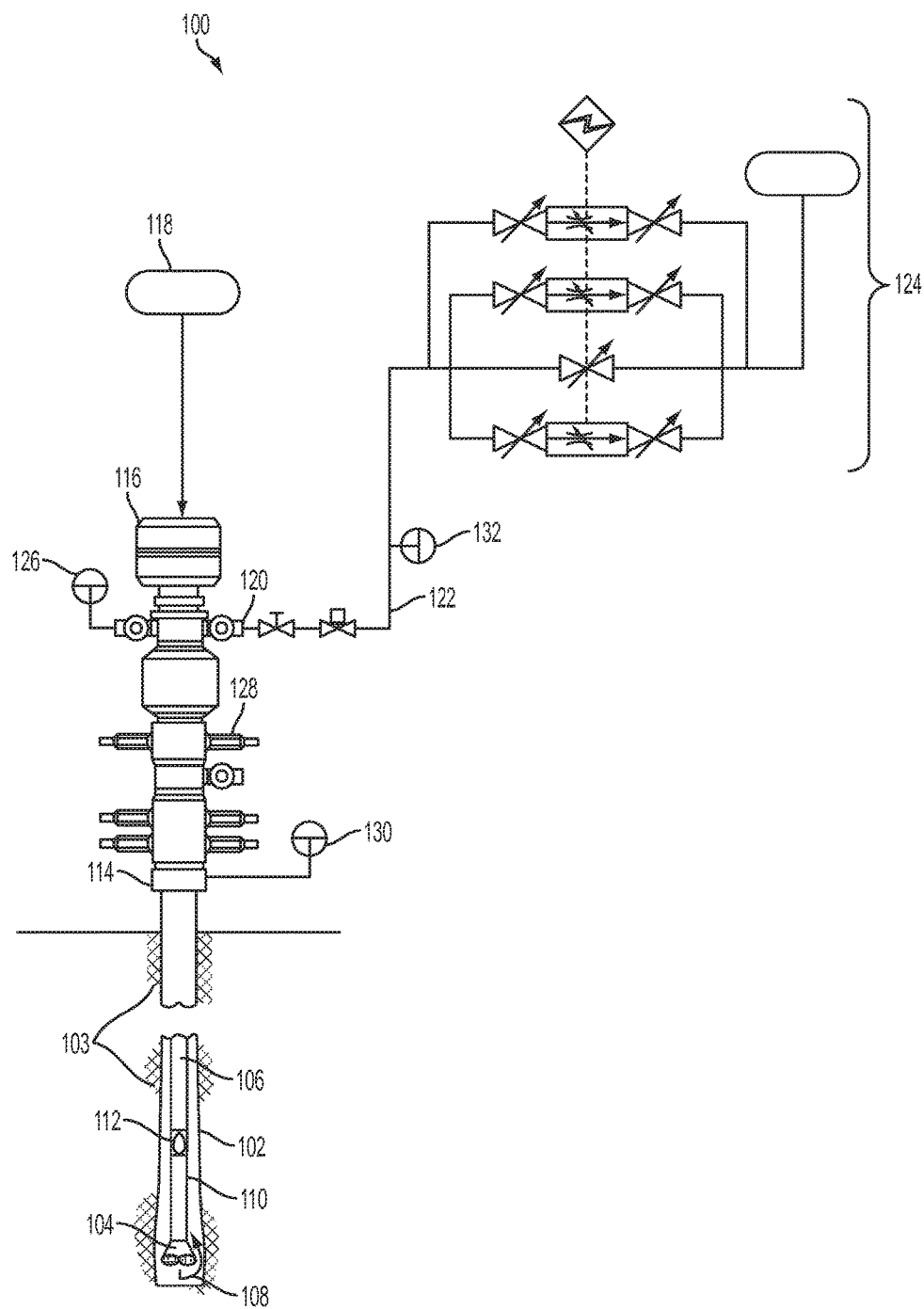
FIG. 1A is a schematic diagram of a well drilling system having a drill string coupled to a valve assembly, according to some aspects of the present disclosure.

Certain aspects of the present disclosure relate to the arrangement and control of a system of choke valves deployed in a wellbore environment, where the choke valves, arranged in an assembly or manifold configuration, regulate fluid flow through a casing. A primary choke valve (alternatively referred to as a control choke or an active choke) functions to regulate fluid flow through the primary choke, and choke valve system as a whole, based on parameters such as pressure or a valve coefficient of flow (Cv). One or more supplemental choke valves (alternatively referred to as secondary, tertiary, flow support, or helper chokes) function to help maintain the pressure and flow through the primary choke within or near an optimal operating range for the primary choke. The status of and fluid flow conditions within the primary choke can be monitored and measured, providing data to a controller element, where the controller element can adjust the status of the one or more supplemental chokes. The adjustment of the primary choke and the one or more supplemental chokes can be an automatic process, operating according to settable parameters that can alter the path of fluid flow and pressure in the choke valve system, and thereby control pressure in the connected wellbore.

Control of pressure at the bottom of a wellbore ("bottom hole pressure") is important in managed pressure drilling, and in other types of drilling operations. Preferably, the bottom hole pressure is accurately and precisely controlled in order to prevent: excessive loss of fluid into the earth formation surrounding the wellbore, undesired fracturing of the formation, undesired influx of formation fluids into the wellbore, and the like. In typical managed pressure drilling, it can be beneficial to maintain the bottom hole pressure at a level just greater than a pore pressure of the earth formation, without exceeding a fracture pressure of the earth formation. Conversely, in typical underbalanced drilling, it can be beneficial to maintain the bottom hole pressure at a level somewhat less than the pore pressure, thereby obtaining a controlled influx of fluid from the earth formation.

Generally, a well drilling system is operable such that when drilling the wellbore, the well drill system can be kept at or about the constant bottom hole pressure. As the wellbore is being drilled, however, there is variation with the generated flow of gas, fluid, slurry, and other matter (broadly referred to as "fluid") that passes through the well drilling system. Conventionally, a control system can monitor flow characteristics and, given a sufficient data set, develop a trend. Based on trend analysis, the control system can adjust the degree to which valves in the system are open or closed to regulate the pressure in the well system and to control the bottom hole pressure. For some extreme events, however, the pressure of the flow can change rapidly and briefly, then returning to the previous flow pressure. In some systems, if an extreme event is localized or in a closed-loop control section of the well drilling system piping, the controller may not be able to respond, and there may be no response to account for the extreme event, which can lead to fluid loss.

A generalized measure for the fluid flow characteristics that can be used is the valve coefficient of flow ($C_V$), a relationship between the flow pressure, flow rate, and physical characteristics of the relevant piping (e.g. internal diameter of pipe, thickness of pipe wall). Any given choke valve used for managed pressure drilling has a defined range of positions which correspond to the individual $C_V$ range for a choke valve that gives functional results while controlling pressure and flow. In a system of choke valves, one choke valve can be utilized as the primary choke which is configured to automatically hold a set point for pressure in the system. Changes in flow rate, pressure, or $C_V$ can cause the choke valve to move outside that range. If an operator is unaware of how close the choke valve is to the edge of its range, then controlled changes to the flow or pressure set point of the choke valve could move the choke valve to a position that causes poor control of the well. This could damage the formation or cause a well control incident, such as a gas kick.

By using one or more supplementary choke valves and a programmable logic controller (PLC) monitoring choke positions or valve coefficients, an automatic control system can detect when a primary choke valve, operating as the pressure set point controlling choke, is approaching the edge or limits of its controllable range. The automatic control system can then move the one or more supplementary choke valves in a direction to further open or close to compensate for the excessive or minimal flow through the pressure set point controlling primary choke. The automatic control will then drive the pressure set point controlling primary choke valve to move or actuate its opening to a point more securely within an operable and controlled range, due to the nature of the pressure set point control algorithm.

In aspects of this assembly and method, choke valves can be arranged in parallel to sequentially handle larger maximum flow rates in an autonomous fashion so that operator error can be minimized. Such a choke valve system or assembly can then rapidly handle extreme events, such as when a large flow rate causes multiple choke valves to open in order to keep the pressure set point-controlling primary choke in an optimum range. Such a choke valve system or assembly can also rapidly handle an extreme event, such as when a flow rate suddenly drops to zero due to a rig pump failure, quickly closing choke valves in order to maintain the pressure set point-controlling primary choke in its optimum range until all of the supplementary choke valves were completely closed.

In some aspects, the automatic control system or a system-level control unit can have a proportional-integral-derivative (PID) controller to control the opening and closing of the choke valves in the assembly. The PID controller can be programmed to a have a dynamic set point with adjustable PID settings, being operationally coupled to one or more assembly-level control units which can adjust or program the settings of each individual choke valve, where the control unit for each choke valve can be a localized hardware processor, akin to firmware, physically located on the valve. The PID controller can be coupled to the one or more choke valves in an assembly to coordinate and control the opening and closing of each choke valve. The PID controller can have a dynamic pressure set point, such that as the automatic control system receives sensory data, the PID controller can calculate and adjust (in real-time) the degree to which each choke valve in the assembly should be open to maintain an appropriate, operational, or desired pressure set point. Similarly, the PID controller can dynamically adjust the PID settings, which can be the rate at which any given choke valve in the assembly actuates toward an open or closed position. In such aspects, any given choke valve of the choke valve assembly can be set to actuate faster or slower than other choke valves of the assembly. Accordingly, as the automatic control system received sensory data, the PID controller can alter the rate at which a primary choke or any given supplementary choke actuates in order to achieve or maintain an appropriate, operational, or desired pressure set point.

In alternative aspects, the automatic control system or a system-level control unit can have one or more PID controllers to control the opening and closing of the choke valves in the assembly. In situations where while drilling a significant change in pressure is anticipated, the dynamic adjustment of a pressure set point or PID settings may require a reaction time longer than optimal for controlled operation of the drilling system. Where the automatic control system has one or more PID controllers, the PID controllers can be set to different set points, such that the automatic control system can, for example, switch from controlling the choke valve assembly according to parameters of a first PID controller in favor of parameters of a second PID controller. In such aspects, switching from a first PID controller, with a first set of values for pressure set point and PID adjustment settings, to a second PID controller, with a second set of values for pressure set point and PID adjustment settings, can provide for a more rapid reaction to changes in pressure or flow in the drilling system than the dynamic control of a single PID controller.

Each control unit has a detector to monitor the variable and transient data of the flow through each choke valve. Further, each choke valve control unit can execute a monitoring program to measure flow characteristics of the choke valve to which it is coupled, where the monitoring program can run repeatedly and continuously. In some aspects, the localized monitoring program can run about twenty times per second (20x/sec) on the choke valve assembly; i.e. the control unit will check to see if the valve need adjusting twenty times per second. In further aspects, the localized monitoring program can be configured to run about once per second (1x/sec), five times per second (5x/sec), ten times per second (10x/sec), thirty times per second (30x/sec), forty times per second (40x/sec), fifty times per second (50x/sec), sixty times per second (60x/sec), or at any interval or gradient at or within a range bounded by these rates. In yet further aspects, the localized monitoring program can be configured to run at a rate greater than sixty times per second (>60x/sec), or at a rate lesser than once per second (<1x/sec).

A choke valve can be automatically characterized with an array plotting $C_V$ versus the degree to which the valve is open, using an external flow measurement device and knowledge of the specific gravity of the fluid flowing through the choke valve. This characterization can be used to modify a standard or baseline $C_V$ versus valve position array to provide a more accurate setting of the controllable range of the choke valve(s). Thus, a theoretical $C_V$ can be modified with calibration to measured data.

Aspects of the choke valve assembly of the present disclosure, which can generally be said to be on the "backside" of a well system, can provide for a more responsive, efficient, and precise control than traditional trend analysis. In some applications, adjustments based on trend analysis can lead to an overcorrection of opening or closing a given valve, thereby potentially leading to further problematic pressure and flow in the system. In particular aspects of the present disclosure, the control unit and control hardware to adjust the choke valves or the choke valve assembly can be proximate or coupled to the actual valve hardware. The direct, localized control can account for extreme flow events such as pressure spikes with increased efficiency and responsiveness.

In other aspects, the control unit can instruct any one or more of the choke valves to open (e.g., decrease restriction to flow of the fluid through a drilling fluid the return line) according to a predetermined amount automatically in response to a data signal indicating that a fluid loss has occurred, or is substantially likely to occur. For example, if a measured parameter signature matches (or substantially matches) the event signature for a fluid loss, then the control unit will operate the controller to open the operative choke valve(s) by the predetermined amount. In some aspects, the predetermined amount can be measured as a percentage of the choke valve operating range, such as 1%, 5%, 10%, 25%, 50%, 75%, 100% of the operating range, any increment or gradient thereof, or any range defined by these bounds.

In various aspects, the predetermined amount of choke valve adjustment can be preprogrammed into the control unit, be input via a human-machine interface, be input via a communication medium from a coupled specialized computer, or be a combination thereof. After the choke valve(s) have been opened the predetermined amount, control over operation of the valves choke(s) can be return to maintaining the wellbore or standpipe pressure set point, where such a set point can be obtained, from a hydraulics model, a manual input, or the like, and where the choke valve(s) can be manually operated, or where another manner of controlling the choke(s) can be implemented.

In other aspects, the control unit can provide an alert or an alarm to an operator that a particular event has occurred, or is substantially likely to occur. The operator can then take any needed remedial actions based on the alert or alarm, or can override any actions taken by the control unit automatically in response to the signal indicating that a particular even that occurred or is substantially likely to occur. If action has already been taken by the control unit, the operator can optionally undo, reverse, or modify such actions.

The illustrative examples discussed herein are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "uphole" and "downhole" in relation to the illustrative aspects as they are depicted in the figures, the uphole direction being toward the surface of the well or top of the tube assembly, and the downhole direction being toward the toe of the well or bottom of the tube assembly. Further, descriptions such as "upstream" and "downstream" in relation to the illustrative aspects as they are depicted in the figures, the upstream direction being the direction from which fluid enters a given region, and the downstream direction being the direction fluid flows away from a given region. Portions of structural elements described herein can be referred to by the general orientation of their ends when deployed, e.g. by an uphole end, a downhole end, an upstream end, or a downstream end. Like the illustrative aspects, the numerals and directional descriptions included in the following sections should not be interpreted to improperly limit the present disclosure.

While specific systems and examples herein disclose structures including a primary choke, a secondary (supplemental) choke, and optionally a tertiary (supplemental) choke, it should be understood that the choke valve assembly considered herein can include a plurality of supplemental chokes inclusive and greater than an assembly with one or two supplemental chokes. Further choke valve assemblies according to the present disclosure can include three, four, five, ten, twenty, or any incremental number of supplementary chokes inclusive or beyond a secondary (supplemental) choke and a tertiary (supplemental) choke. An automatic control system for the choke valve assemblies considered herein can coordinate the degree to which, and the rate at which, each and every choke valve, primary and supplemental, of the assembly can actuate, in order to maintain a given set point or other controlling parameter for the system.

FIG. 1A is a schematic diagram of a well drilling system having a drill string coupled to a valve assembly. Representatively and schematically illustrated in FIG. 1A is a well drilling system 100 and associated method which can incorporate principles of the present disclosure. In the system 100, a wellbore 102 formed in an earth formation 103 is drilled by rotating a drill bit 104 on an end of a drill string 106. Drilling fluid 108 (commonly known as mud) is circulated downward through the drill string 106, out the drill bit 104, and upward through an annulus 110 formed between the drill string 106 and the wellbore 102, in order to cool the drill bit, lubricate the drill string, remove cuttings, and provide a measure of bottom hole pressure control. A non-return valve 112 (which can be a flapper-type check valve) prevents flow of the drilling fluid 108 upward through the drill string 106 (e.g., when connections are being made in the drill string).

In some aspects, nitrogen, another gas, or a lighter weight fluid, may be added to the drilling fluid 108 for greater pressure control. This technique can be useful, for example, in underbalanced drilling operations.

In the system 100, additional control over the bottom hole pressure can be obtained by closing off the annulus 110 (e.g., isolating the annulus from communication with the atmosphere and enabling the annulus to be pressurized at or near the surface) using a rotating control device 116 (RCD). The RCD 116 seals about the drill string 106 above a wellhead 114, located at or above the surface opening of the wellbore 102. Represented schematically in FIG. 1A, the drill string 106 can extend upwardly through the RCD 116 for connection to, for example, a rotary table, a standpipe line, a kelley drive, a top drive, and/or other conventional drilling equipment 118.

The drilling fluid 108 can exit the wellhead 114 via a wing valve 120 in fluid communication with the annulus 110 below the RCD 116. The fluid 108 can then flow through drilling fluid return line(s) 122 to a choke valve assembly 124 (alternatively referred to as a choke valve manifold). Backpressure is applied to the annulus 110 by variably restricting flow of the fluid 108 through the choke valve assembly 124.

The greater the restriction to flow through the choke valve assembly 124, the greater the backpressure applied to the annulus 110. Thus, bottom hole pressure can be conveniently regulated by varying the backpressure applied to the annulus 110. A hydraulics model can be used to determine a pressure applied to the annulus 110 at or near the surface which will result in a desired bottom hole pressure, so that an automated control system (or an operator) can readily determine how to regulate the pressure applied to the annulus at or near the surface in order to obtain the desired bottom hole pressure.

Pressure applied to the annulus 110 can be measured at or near the surface via a variety of pressure sensors in communication with the annulus. Further, downhole pressure sensors, such as pressure while drilling (PWD) sensors close to, or positioned on, the rotating drill bit 104 can sense pressure and provide information to a control system. A pressure sensor 126 can sense pressure below the RCD 116, but above a blowout preventer (BOP) stack 128. A pressure sensor 130 can sense pressure in the wellhead 114 below the BOP stack 128. A pressure sensor 132 can sense pressure in the drilling fluid return line(s) 122 upstream of the choke valve assembly 124.

Figure 1B:
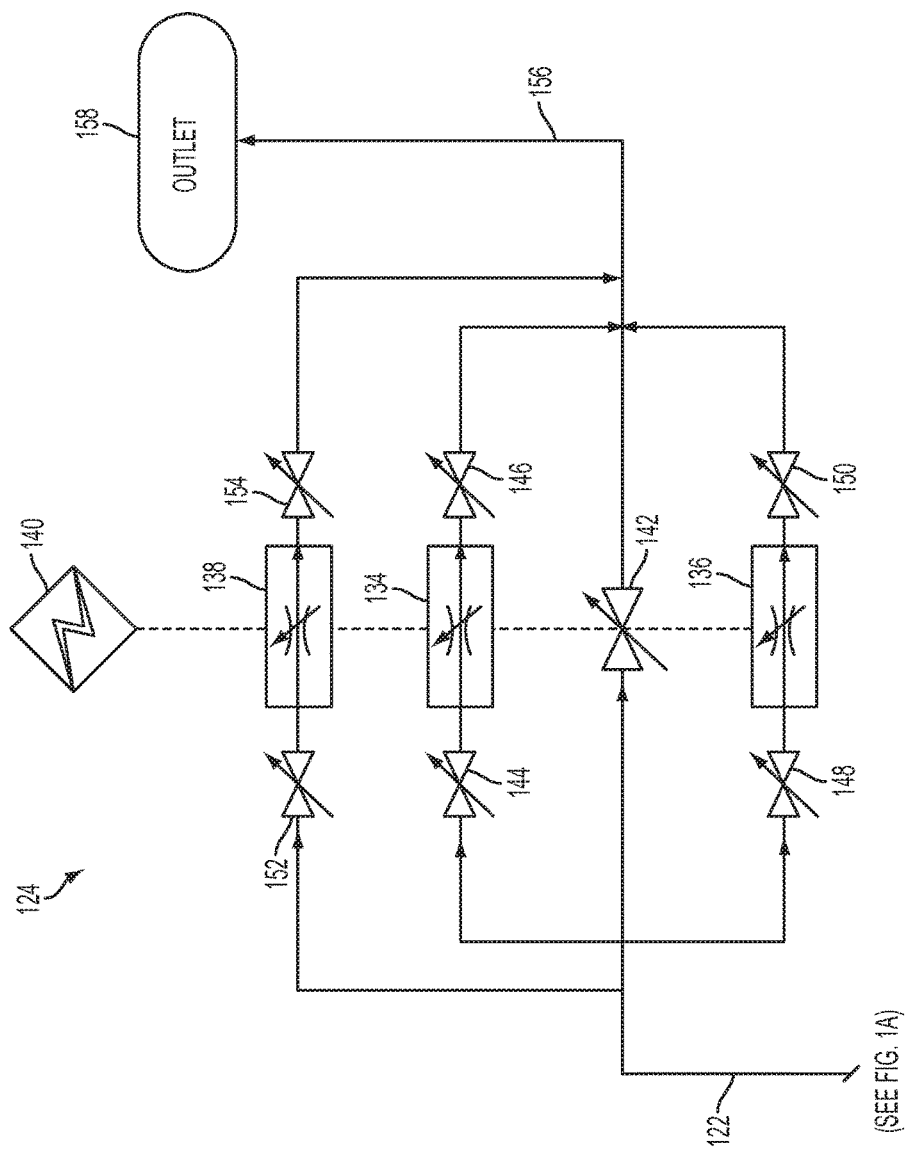
FIG. 1B is a schematic diagram of the valve assembly as shown in FIG. 1A, according to some aspects of the present disclosure.

FIG. 1B is a schematic diagram of the valve assembly 124 as shown in FIG. 1A. Fluid flows through the drilling fluid return line(s) 122 into a series of valves which in some aspects can be arranged in series and in parallel. In aspects as illustrated, the valve assembly 124 can have three choke valves arranged in parallel, with additional valves (such as check valve) arranged in series leading into or trailing from each choke valve. The valve assembly 124 can have a primary choke 134, a secondary choke 136, and a tertiary choke 138. In further aspects, the valve assembly can have more than two supplementary chokes connected in series and/or in parallel with the primary choke 134. Each of the choke valves can be controllable by a control unit 140 which can send instructions to hardware controllers on each of the choke valves to open or close the choke to a certain degree. The control unit 140 can operate the primary choke 134, secondary choke 136, and the tertiary choke 138 concurrently and in concert to manage the fluid flow received through the drilling fluid return line(s) 122. The valve assembly 124 can further include an independent non-choke valve, referred to as an independent valve 142 in parallel with the choke valve, where the independent valve 142 can act as an emergency flow and pressure release if the one or more choke valves are driven toward failure conditions.

The control unit can include a non-transitory, computer-readable medium and a microprocessor, programmed with computer code instructions and data specific to choke valve operation, which can send operation instructions to other elements of a choke valve assembly. In particular, the control unit 140 is programmable by an operator and can store information regarding the characteristics, such as the trim, are for each choke valve in the valve assembly 124. Based on the individual valve dimensions for the primary choke 134, secondary choke 136, and the tertiary choke 138, the control unit 140 can determine or have pre-programmed setting for the ideal operational range for each choke valve. Further, the control unit 140 can adjust the supplementary choke valves to re-route flow away from a primary choke valve 134 to a sufficient degree when necessary. The control unit can also account for parameters including, but not limited to, the density of the flow medium and the physical characteristics of other pipes in the valve assembly 124. The control unit 140 can further be in communication with a user interface which can allow for an operator to manually adjust the settings or reprogram the parameters stored or programmed into the control unit 140.

In some aspects, the control unit 140 can be in communication with a PID controller coupled to each of the primary choke 134, secondary choke 136, and the tertiary choke 138. In other aspects, the control unit 140 can be in communication with PID controllers coupled to each of the primary choke 134, secondary choke 136, and the tertiary choke 138. Each PID controller, individually or in combination, can react relatively quickly or slowly to adjust a choke valve and thereby control pressure in a system. Moreover, each PID, individually or in combination, can be particularly be programmed to adjust the rate of a choke valve at a rate relative to the other choke valves in the valve assembly 124. Generally, a choke valve with a PID set to monitor pressure is configured to adjust the related choke valve at a rate slower than the other choke valves in the valve assembly 124. If two controlling valves are both configured to control according to the same pressure set point at the same rate, they would contend with each other to both reach the target pressure at the same speed. Accordingly, in some aspects, the primary choke can be set to operate at a first target pressure and to adjust relative quickly in response to detected flow pressure, where a supplementary choke can be set to operate at a target pressure (which can be the first target pressure or a second target pressure different from the first target pressure) and to adjust relatively slowly in response to the detected flow pressure.

In other aspects, the primary choke can be set to respond to a parameter such as pressure while a supplementary choke can be set to respond to a different flow parameter, such as $C_V$. In other aspects, a choke valve can be set to detect the physical position of an element of the primary choke valve, where a positional sensor is located at a range limit within the choke valve, and triggering of the positional sensor informs the control unit 140 that the primary choke 134 is approaching or has reached a physical limit and thus the one or more supplemental choke valves should be opened to either a greater or lesser degree.

The primary choke 134 can be arranged or designed to be the fluid path through which the majority of fluid flow from the drilling fluid return line(s) 122 in configured to flow through to pass through the valve assembly 124. A primary lead valve 144 can be arranged in the flow path before (i.e. upstream of) the primary choke 134 and a primary trailing valve 146 can be arranged in the flow path after (i.e. downstream of) the primary choke 134. Each of the primary lead valve 144 and the primary trailing valve 146 can be a check valve, a ball valve, plug valve, or other non-choke valve. Each of the primary lead valve 144 and the primary trailing valve 146 can further be controllable by the control unit. Either or both of primary lead valve 144 and the primary trailing valve 146 can close off the flow path through the primary choke 134 if the primary choke 134 has a structural failure or falls out of a controllable range. Each of the lead valves and trailing valves can be used to isolate the related choke, allowing or preventing fluid flow through the related choke. Moreover, in some aspects, any given choke can have one or more lead valves or one or more trailing valves in fluid communication with the related choke.

The secondary choke 136 can be arranged or designed to be the fluid path through which a portion of fluid flow from the drilling fluid return line(s) 122 in configured to flow through to pass through the valve assembly 124, where the portion of fluid flow through the secondary choke 136 can be equal to or less than the flow through the primary choke 134. A secondary lead valve 148 can be arranged upstream of the secondary choke 136 and a secondary trailing valve 150 can be arranged downstream of the secondary choke 136. Each of the secondary lead valve 148 and the secondary trailing valve 150 can be a check valve, a ball valve, or other non-choke valve. Each of the secondary lead valve 148 and the secondary trailing valve 150 can further be controllable by the control unit. Either or both of secondary lead valve 148 and the secondary trailing valve 150 can close off the flow path through the secondary choke 136 if the secondary choke 136 has a structural failure or falls out of a controllable range. In some respects, the secondary choke 136 can be considered as a back-up valve to the primary choke 134. The secondary choke 136 can be coupled with a PID having a different bias or sensory trigger than the bias on the PID controller for the primary choke 134, such that both PID controllers can be used concurrently and the choke valves will not work in competition with each other trying to reach the same set point.

The tertiary choke 138 can be arranged or designed to be the fluid path through which a portion of fluid flow from the drilling fluid return line(s) 122 in configured to flow through to pass through the valve assembly 124, where the portion of fluid flow through the tertiary choke 138 can be equal to or less than the flow through either or both of the primary choke 134 and the secondary choke 136. A tertiary lead valve 150 can be arranged upstream of the tertiary choke 138 and a tertiary trailing valve 154 can be arranged downstream of the tertiary choke 138. Each of the tertiary lead valve 152 and the tertiary trailing valve 154 can be a check valve, a ball valve, or other non-choke valve. Each of the tertiary lead valve 152 and the tertiary trailing valve 154 can further be controllable by the control unit. Either or both of tertiary lead valve 152 and the tertiary trailing valve 154 can close off the flow path through the tertiary choke 138 if the tertiary choke 138 has a structural failure or falls out of a controllable range.

In some aspects, the tertiary choke 138 can be a back-up valve to the back-up function of the secondary choke 136. In other aspects, the tertiary choke 138 can operate as a dual pronged fluid path in concert with the secondary choke 136. The tertiary choke 138 can be coupled with a PID having a different bias or sensory trigger than the bias on the PID controllers for the primary choke 134 or secondary choke 136, such that all the PID controllers can be used concurrently and the choke valves will not work in competition with each other trying to reach the same set point.

In exemplary applications with a single supplementary choke valve, a secondary choke 136 and a tertiary choke 138, or three or more supplementary choke valves, the primary choke 134 is to be kept in its active, functional controllable range using automatic movements of the one or more supplementary choke valves. As the primary choke 134 moves to either the upper or lower end of its controllable range, the control unit 140 automatically triggers the actuation of the one or more supplementary choke valves to drive the primary choke 134 back toward the middle of its functional range. As the one or more supplementary chokes are actuated to be more open or closed, the control unit 140 can wait for a duration of time to measure and determine the effect of the supplementary choke(s) actuation on the primary choke 134. In some aspects, the movement or actuation of the one or more supplementary chokes should be in relatively increments, at or about 1% to 5% of the operational range of a supplementary choke valve, with a settling time between movements. Both the secondary choke 136 and the tertiary choke 138 can have operational ranges defined by their physical characteristics, such as their size, internal diameter, internal components, and the like. In other aspects, the settling time of the one or more supplementary choke valves can be inhibited, bypassed, or reduced in duration in order to be responsive to a detected extreme event, such as a gas kick.

Once through the one or more choke valves, the fluid flow can pass through a drilling fluid outlet line 156 to further fluid processing apparatus 158, such as, for example a Coriolis flowmeter.

In some exemplary applications, there can be a valve assembly 124 with a primary choke 134 and a secondary choke 136, where the secondary choke 136 is the sole supplementary choke. In some aspects, the primary choke 134 and the secondary choke 136 can have the same internal diameter (ID). In other aspects, the primary choke 134 and the secondary choke 136 can have different IDs, where in such aspects the primary choke ID can be greater than the secondary choke ID. In alternative aspects, the primary choke ID can be smaller than the secondary choke ID.

In other exemplary applications, as illustrated, there can be a valve assembly 124 with a primary choke 134, a secondary choke 136, and a tertiary choke 138, where the secondary choke 136 and tertiary choke 138 are both supplementary chokes. In some aspects, each of the primary choke 134, the secondary choke 136, and the tertiary choke 138 can have the same ID. In other aspects, each of the primary choke 134, the secondary choke 136, and the tertiary choke 138 can have different IDs. In some such aspects, the primary choke ID can be greater than both the secondary choke and the tertiary choke IDs, where the secondary choke 136 and the tertiary choke 138 can further have the same or different IDs. In alternative aspects, either or both of the secondary choke 136 and the tertiary choke 138 can have an ID greater than the ID of the primary choke 134.

In some aspects, the function of the choke valves can be switched between choke valves of the valve assembly 124. For example, if the primary choke valve 134 has a structural failure or a blockage, the control unit 140 can switch the majority of fluid flow to a supplementary choke valve, where that supplementary choke valve becomes a new primary choke valve for the duration of operation. In another example, where the designated primary choke valve 134 has an ID different than a supplementary choke valve, such as the secondary choke valve 136 and the tertiary choke valve 138, the ID of either the secondary choke valve 136 or the tertiary choke valve 138 may be preferable to use in order to maintain pressure in the valve assembly 124 and downhole in the wellbore. In further aspects, the choke valve used as the primary choke 134 can be switched to reduce wear on any individual choke valve in the valve assembly 124. Accordingly, the control unit 140 can switch the majority of fluid flow to a supplementary choke valve with a preferable ID for a particular wellbore, where that supplementary choke valve becomes a new primary choke valve for the duration of operation.

Figure 2:
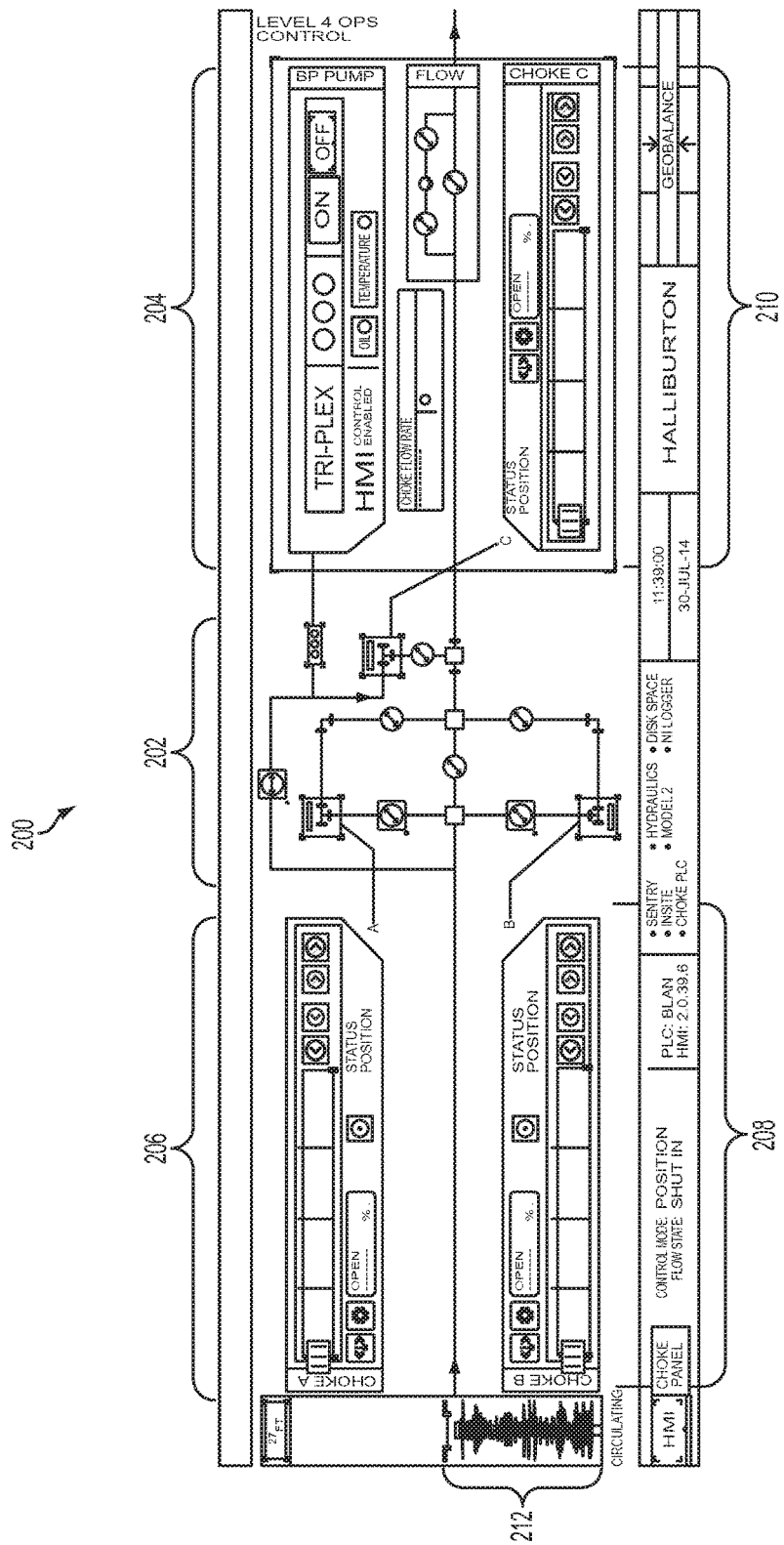
FIG. 2 is an illustration of a user interface for control and display of a valve assembly, according to some aspects of the present disclosure.

FIG. 2 is an illustration of a user interface 200 for control and display of a valve assembly. The valve assembly display 202 (representative of the exemplary valve assembly 124 in FIG. 1B) can indicate the status of each choke valve or other valves in a valve assembly. A system control interface 204 can present data relating to the temperature, flow, and components of the fluid flowing through the choke valves. The system control interface 204 can also indicate whether any individual choke valve is functional or in use. Each choke valve can further include a valve-specific control interface. In some aspects, a first choke valve control interface 206 can control a first choke valve in the valve assembly, a second choke valve control interface 208 can control a second choke valve in the valve assembly, and a third choke valve control interface 210 can control a third choke valve in the valve assembly. Each of the first choke valve control interface 206, second choke valve control interface 208, and third choke valve control interface 210 can indicate the percentage degree to which each respective choke valve is open, along with a graphical representation of to what degree the one or more choke valves are open. The user interface 200 can further provide for manual control to move each individual the choke valve from a position to be more open or more closed, or to lock a particular choke valve in a set position.

In the user interface 200, the drill string can be represented by a rig graphic 212, which can further identify elements of the drill string and indications from sensors on the drill string, or on surface equipment, at the surface of or within a wellbore.

Figure 3:
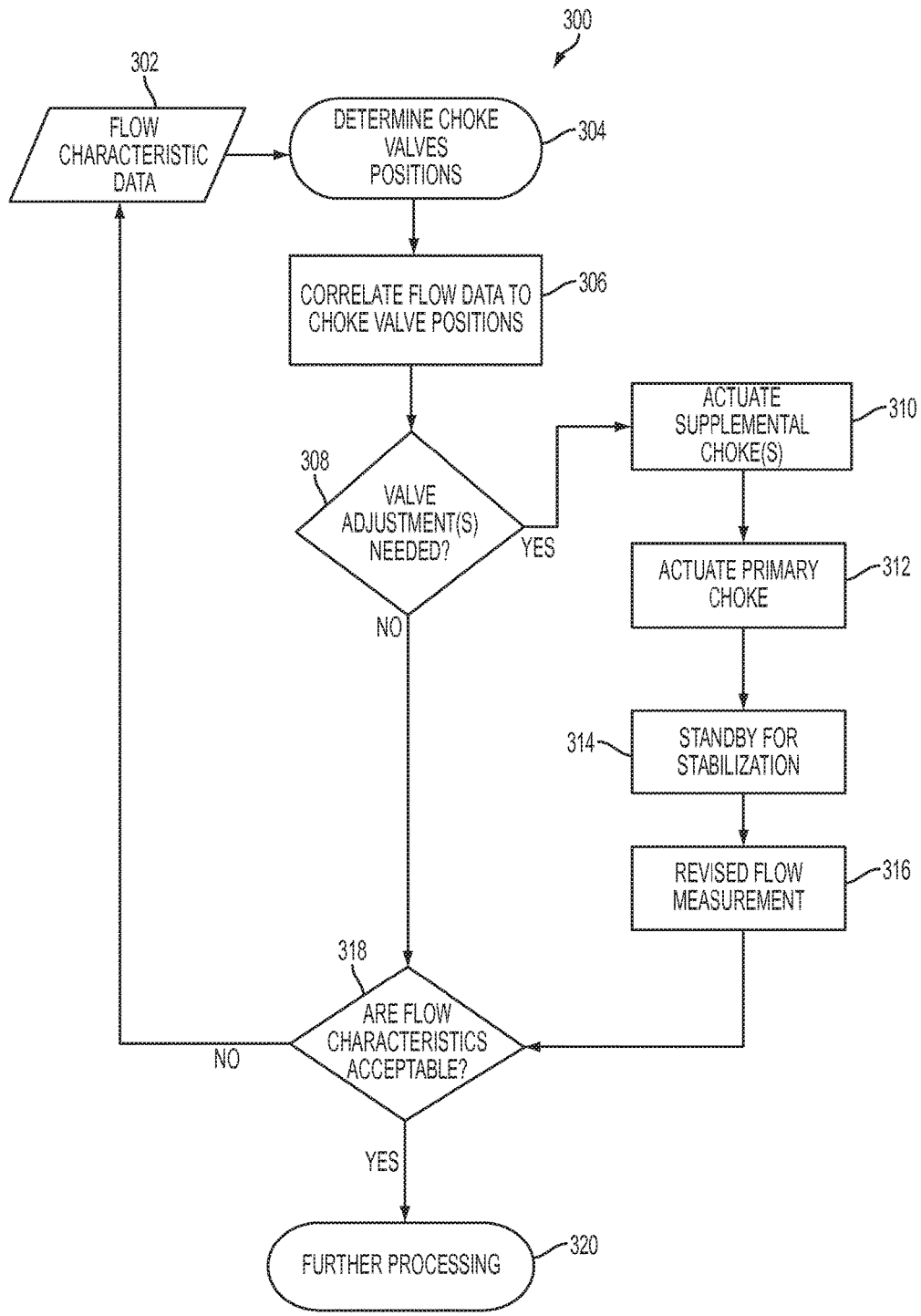
FIG. 3 is a flowchart of a choke valve system control process, according to some aspects of the present disclosure.

FIG. 3 is a flowchart 300 of a choke valve system control process, particularly for adjusting a primary choke and any supplementary chokes in response to flow characteristics of fluid passing through the choke valve assembly. At step 302, data is received by the control unit regarding flow characteristics of the fluid passing through the choke valve assembly. This data can be received from one or more sensors located proximate to or on the individual choke valves of the choke valve assembly, or from additional sensors such as pressure sensors coupled to the pipes and tubing though which fluid flows. At step 304, the control unit receives or checks the position of each choke valve in the choke valve assembly, e.g. the degree to which each choke valve is open. At step 306, the control unit can correlate the flow characteristic data with the positions of the choke valves, in some aspects can be calculating a $C_V$ value, to determine the status of each choke valve and if any choke valve is close to or approaching an uncontrollable range. At step 308, in many aspects, the control unit can automatically make a determination if adjustment to the choke valves is needed, based in part on preprogrammed data regarding the operative range of the choke valves in the system. In some aspects, an operator can make the determination if an adjustment to the choke valves is needed. If no adjustment is needed, the process can proceed to step 318. If an adjustment to the choke valves is needed, the process can proceed to step 310.

At step 310, one or more supplemental chokes can be actuated to move to a more open or a more closed position, thereby redirecting a portion of the fluid flow. At step 312, the primary choke of the choke valve assembly can be actuated to move to a more open or more closed position, which will often be actuation opposite to the opening or closing of the one or more supplemental chokes. The actuation of the primary choke and the one or more supplementary chokes can function to maintain a consistent fluid flow and pressure in the choke valve assembly (and thereby maintain a backpressure through the drill string to hold the bottom hole pressure of the wellbore at a constant level). At step 314, the adjustment of the choke valves can pause, allowing the choke valve system to stabilize or reach a new steady state equilibrium, before determining if further adjustment is needed. At step 316, a revised measurement of flow characteristics can be taken to determine the result and effect of the actuation of the primary choke and one or more supplementary choke valves on the fluid flow through the system. At step 318, the control unit can make a determination if the flow characteristics are acceptable. If the flow characteristics are not acceptable, e.g. the primary valve still has a $C_V$ value that is approaching or is in an uncontrollable range, the process can loop back to step 302 and proceed to adjust the choke valves further. If the flow characteristics following choke valve adjustment are acceptable, the process can proceed to step 320 for further processing as may be programmed. In some aspects, this process control can be run continuously as a drilling string operates and removes drilling fluid from a wellbore.

Figures 1, 3:
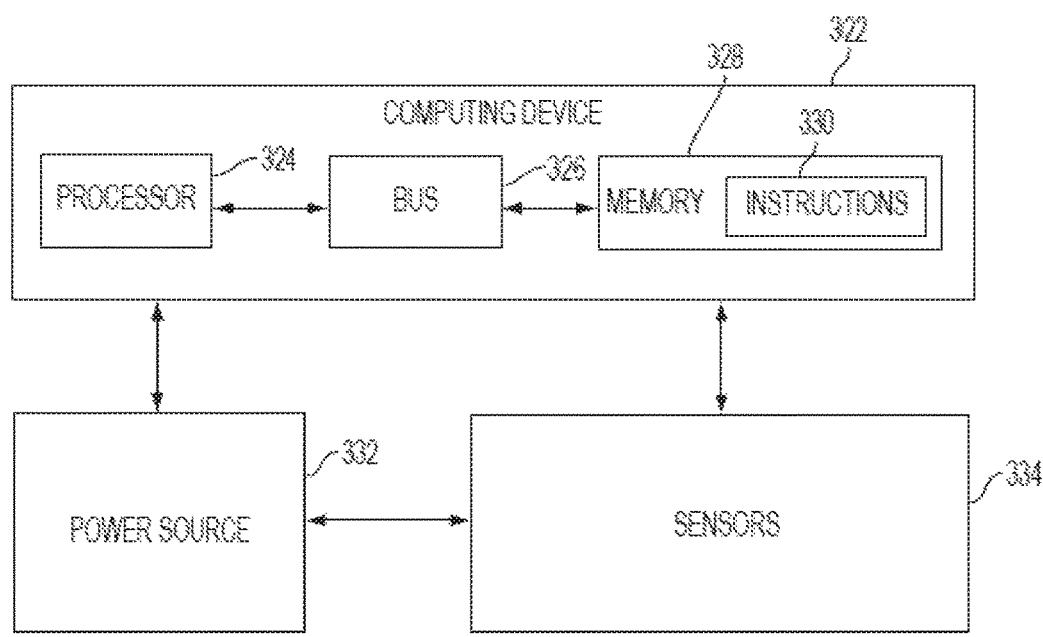

In some aspects as shown in FIG. 3-1, the choke valve system can include a computing device 322 as the control unit programmed with instructions to operate the choke valve system, where the instructions can include, but are not limited to, actuating valves of the choke valve system, monitoring and comparing readings from sensors located throughout the choke valve system, and data handling (e.g. data modification, calculation, manipulation, storage, transmission, and the like). The computing device 322 can include a processor 324, a memory 328, and a bus 326. The processor 324 can execute one or more operations for operating the choke valve system. The processor 324 can execute instructions 330 stored in the memory 328 to perform the operations. The processor 324 can include one processing device or multiple processing devices. Non-limiting examples of the processor 324 include a Field-Programmable Gate Array ("FPGA"), an application-specific integrated circuit ("ASIC"), a microprocessor, etc. The processor 324 can be communicatively coupled to the memory 328 via the bus 326. The non-volatile memory 328 may include any type of memory device that retains stored information when powered off. Non-limiting examples of the memory 328 include electrically erasable and programmable read-only memory ("EEPROM"), flash memory, or any other type of non-volatile memory. In some examples, at least some of the memory 328 can include a medium from which the processor 324 can read the instructions 330. A computer-readable medium can include electronic, optical, magnetic, or other storage devices capable of providing the processor 324 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

The choke valve system can further include a power source 332. The power source 332 can be in electrical communication with the computing device 302 and the sensors 334 of the choke valve system. In some examples, the power source 332 can include a battery (e.g. for powering the choke valve system or sensors 334). In other examples, the choke valve system or sensors 334 can be coupled to and powered by an electrical cable (e.g., a wireline). Additionally or alternatively, the power source 332 can include an AC signal generator. The computing device 322 can operate the power source 332 to apply instruction signals to the valves of the choke valve system and to read data from the sensors 334.

Figure 4:
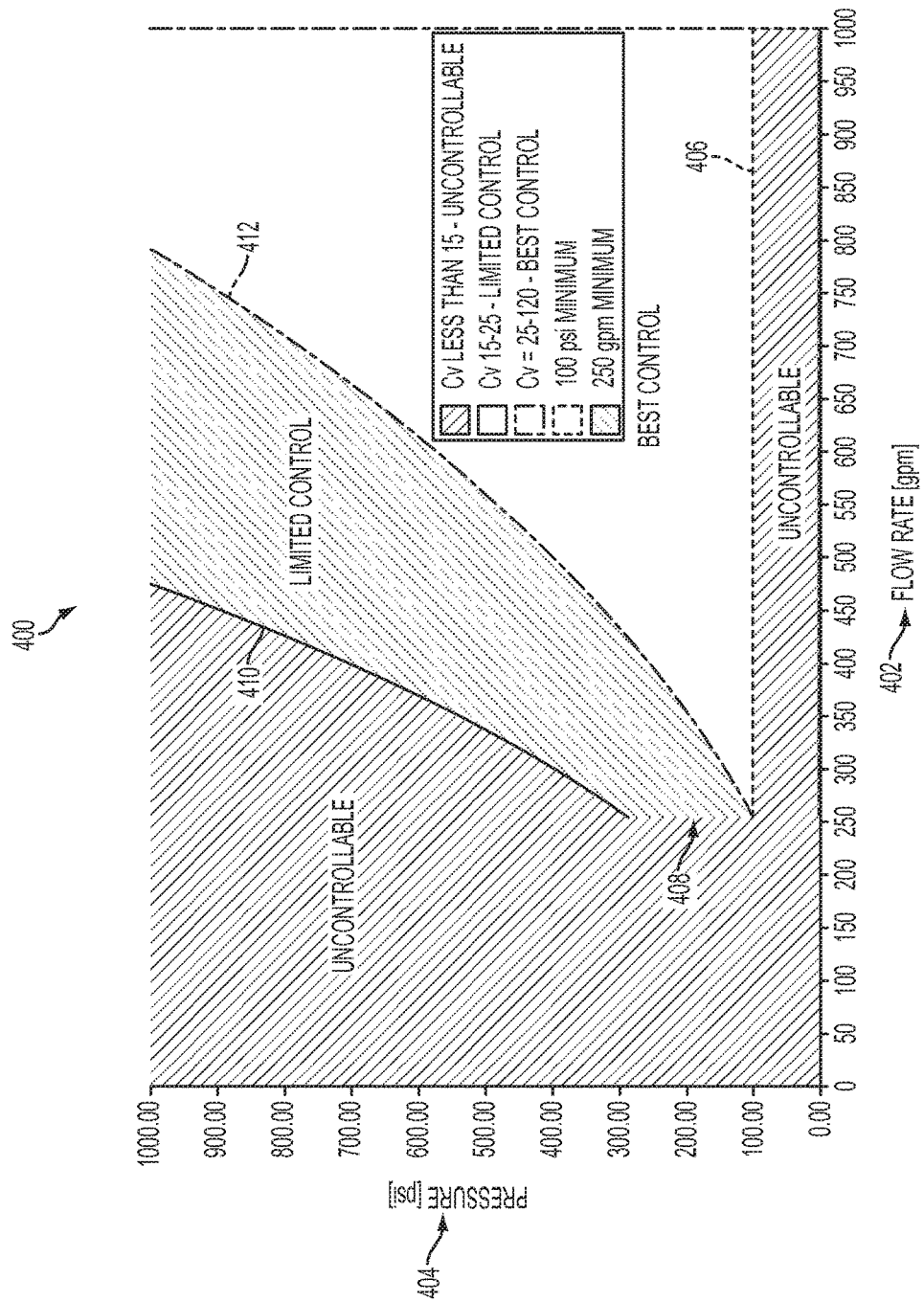
FIG. 4 is a graph illustrating a controllable range of a choke valve, according to some aspects of the present disclosure.

FIG. 4 is a graph illustrating a controllable range of a choke valve 400, particularly plotting pressure 404 versus flow rate 402 in a choke valve having a three inch (3") trim. The controllable range of the exemplary choke valve requires a minimum fluid flow pressure 406, below which the choke valve will not optimally function. For a choke valve as given, the minimum pressure 404 can be 100 pounds per square inch (psi). Similarly, the exemplary choke valve has a minimum flow rate 408 below which the choke valve will not optimally function. For a choke valve as given, the minimum flow rate 402 can be 250 gallons per minute (gpm). As noted above, the relationship between the pressure 404 and flow rate 402 in the exemplary choke valve can be used to calculate a $C_V$ curve for a given choke valve. It can be understood that a choke valve having different physical characteristics than the choke valve given in FIG. 4 will have a different $C_V$ curve appropriate to the choke valve trim, structure, and other physical characteristics.

In particular, FIG. 4 illustrates a limited control $C_V$ curve 410 and a best control $C_V$ curve 412 for the given choke valve. At flow rates and pressures above the limited control $C_V$ curve 410, the choke valve can maintain at least limited control over the fluid flow passing therethrough, where in some aspects the limited control $C_V$ curve 410 can have $C_V$ values of from about 15 to 25. At flow rates and pressures above the best control $C_V$ curve 412, the choke valve can maintain ideal control over the fluid flow passing therethrough, where in some aspects the best control $C_V$ curve 412 can have $C_V$ values of from about 25 to 120. A $C_V$ value less than 15 for the given choke valve is outside the controllable range of the choke. If the given choke valve of FIG. 4 is a primary choke valve, when the $C_V$ value of the primary choke valve is in the region between the limited control $C_V$ curve 410 and the best control $C_V$ curve 412, a control unit coupled to the choke valve can adjust supplementary choke valves in the choke valve assembly in order to maintain the primary choke valve within at least its limited control range, and preferentially in its best control range. In further aspects, a given choke valve can have a maximum pressure and a maximum flow rate.

The control unit for a choke valve assembly, and any human-machine interface (HMI) coupled to the choke valve assembly, should be programmed with information about the trim size in each choke valve. This allows the control unit, or other control system or processor, to determine the relevant set of $C_V$ values and operational range to use for optimizing the choke, specifically the maximum, minimum, and any ideal operating positions or $C_V$ curves.

Table 1 presents upper bound and lower bound $C_V$ values and corresponding positions (i.e. the degree to which a choke can be open within its controllable range) for the given choke trims. Accordingly, when the choke valve is open to a degree less than a minimum percentage, the $C_V$ value may drop out of a controllable range. Similarly, when the choke valve is open to a degree greater than a maximum percentage, the $C_V$ value may exceed a controllable range.

TABLE 1

| Trim (inches) | Lower $C_v$ | Min Open Position | Upper $C_v$ | Max Open Position |
|---|---|---|---|---|
| 1.5 | 8 | 37% | 55 | 80% |
| 2 | 12 | 48% | 60 | 76% |
| 3 | 25 | 33.1% | 120 | 70.2% |

Other characteristics of a choke valve, such as the overall length of the valve, the average internal diameter of the valve, the material from which the valve is made, and other elements in fluid communication with the valve or valve assembly can further effect the upper and lower bound $C_V$ values of a given choke valve.

Figure 5:
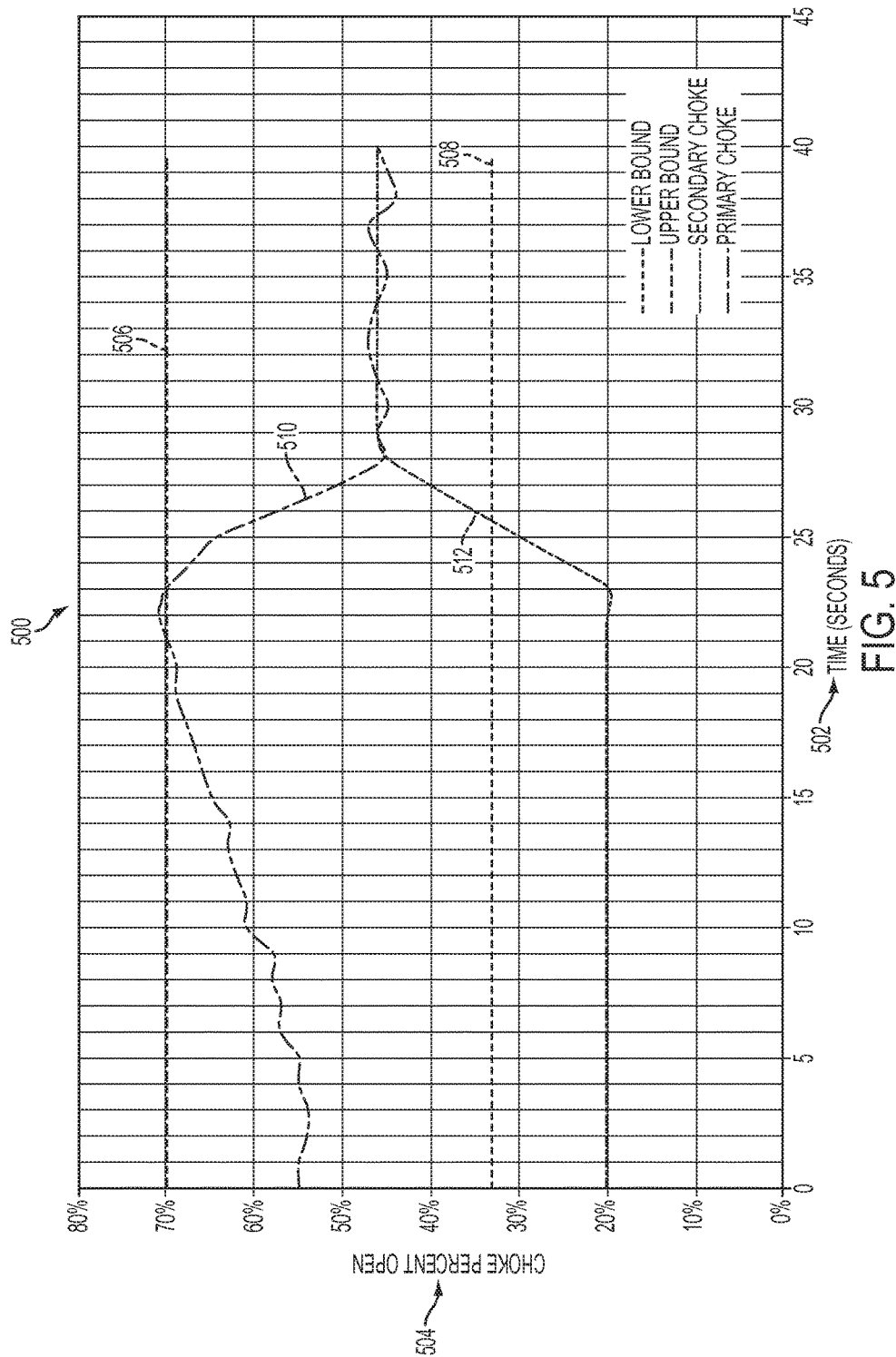
FIG. 5 is a graph illustrating a dynamic interaction between a primary choke valve and a secondary choke valve, according to some aspects of the present disclosure.

FIG. 5 is a graph 500 illustrating a dynamic interaction between a primary choke valve and a secondary choke valve. The graph 500 displays a relationship between the primary choke and the secondary choke in a choke valve assembly over time 502 (on the horizontal axis), particularly the degree to which each of the primary choke and the secondary choke are open, measured as a percentage openness 504 (on the vertical axis). As noted, a choke valve, such as either or both of the primary choke and the secondary choke, can be ideally operable within an ideal range, defined by an upper range bound and a lower range bound (alternatively referred to as a limit). As shown in FIG. 5, a choke valve can have an upper range bound 506 and a lower range bound 508 for the ideal operability of the choke valve. The upper range bound 506 and lower range bound 508 can further reflect the controllable range of a choke valve, where when a choke valve is open to a degree greater than about the upper range bound 506 or open to a degree below about the lower range bound 508, the choke valve is not able to maintain a pressure in the well system or at the bottom of a wellbore within a desired range. In some aspects, where the primary choke valve is designed to be operable within the controllable range, the upper range bound 506 can be the primary choke valve being about 70% open and the lower range bound 508 can be the primary choke valve being about 30% open. In other aspects, depending on the structural characteristics of a given choke valve, the upper range bound 506 and lower range bound 508 can be greater or less than the exemplary bounds shown in FIG. 5.

On the graph 500, the degree to which the primary choke is open over time can be shown by the primary choke trace 510, and the degree to which the secondary choke is open over time can be shown by the secondary choke trace 512. As the primary choke opens to a greater degree such that primary choke trace 510 approaches and passes the upper range bound 506, the secondary choke can open to distribute the amount of flow away from the primary choke. Accordingly, as the secondary choke opens, the secondary choke trace 512 can increase. In some aspects, the secondary choke can be about 20% open before reacting to the primary choke trace 510 reaching the upper range bound 506. In other aspects, the secondary choke can be completely closed, or open to some other percentage, before reacting to the primary choke trace 510 reaching the upper range bound 506. As the secondary choke opens to distribute flow away from the primary choke, the secondary choke trace 512 can increase and the primary choke trace 510 can decrease until both are within the range defined by the upper range bound 506 and the lower range bound 508. In some aspects, the primary choke trace 510 and the secondary choke trace 512 can meet at a point where both the primary choke and the secondary choke are open to about the same degree. As the primary choke adjusts to control pressure with the increased flow through the secondary choke, the primary choke trace 510 can fluctuate around the secondary choke trace 512 until an equilibrium is reached for flow through both the primary choke and the secondary choke.

In further aspects, where the primary choke trace 510 approaches the lower range bound 508, reflecting the primary choke being closed to a greater degree, the secondary choke can close to distribute more flow through the primary choke. Accordingly, the secondary choke trace 512 can decrease. (As presented in FIG. 5, the upper range bound and lower range bound are bounds that apply to the primary choke.)

Table 2 further illustrates the example, where the flow rate and set point pressure are constant, and accordingly a constant Cv should be maintained. Table 2 shows the adjustment of a primary choke and a supplemental choke to maintain a Cv of about 119 to 120.

TABLE 2

| | Primary Choke (3") | | Supplemental Choke (3") | |
|---|---|---|---|---|
| Time (sec) | Degree Open | Cv | Degree Open | Cv |
| 0 | 70.0% | 119.28 | 20% | 0.58 |
| 1 | 67.0% | 111.8 | 25% | 7.48 |
| 2 | 64.3% | 104.9 | 30% | 14.38 |
| 3 | 57.4% | 87.745 | 35% | 31.535 |
| 4 | 50.4% | 70.59 | 40% | 48.69 |
| 5 | 45.5% | 60.135 | 45% | 59.145 |

As illustrated and reflected in Table 2, both the primary choke and the supplemental choke can have a 3" trim. In this example, the supplemental choke (a secondary choke) can begin in an preset pressure control mode, open at 20% of its range, and be automatically taken out of that preset control mode in order to be used to keep the primary choke within its operating range for controlling a pressure set point. As the primary choke approaches the upper limit of its controllable range, as indicated by its position reaching 70%, a programmed routine can be initiated to consistently close the primary choke in order to bring it back to its 50% open position, by incrementally opening the supplemental choke.

In some aspects, where the supplemental choke is open to some degree, such as 20% open, the supplemental choke can then open further by approximately 5% every ten (10) seconds thereafter until the primary choke, which is gradually closing as the supplemental choke opens, reaches a position where the primary choke is less than 50% open. More generally, the supplemental choke can be controlled to open by a percentage of the total actuating range of the supplemental choke over a set time period, until a desired position of the supplementary choke is reached. In other aspects, if the supplemental choke is fully closed (or at a bumper position for closed), the supplemental choke can first open to 25%, then open further by approximately 5% every ten (10) seconds thereafter until the primary choke, which is gradually closing as the supplemental choke opens, reaches a position where the primary choke is less than 50% open. When the primary choke is less than 50% open, then the programmed routine can be exited. A similar programmable routing can also operate to close a primary choke in cases where the fluid flow rate increases or the required operating pressure drops. In further aspects while running this routine, the supplemental choke can actuate its opening by 1%, 2%, 3%, or 4% per increment. In yet further aspects while running this routine, the supplemental choke can actuate its opening every five (5) seconds, every fifteen (15) seconds, every twenty (20) seconds, or every thirty (30) seconds. The degree to which a supplemental choke can actuate its opening, as well as the rate at which supplemental choke can actuate its opening, can be adjusted during operation of the choke valve assembly. A control unit managing the operation of the primary choke and any supplementary chokes can repeat the process of monitoring flow characteristics, and repeat the process of adjusting or actuating choke valves in the assembly accordingly. Furthermore, the repeated monitoring and adjustment can be a continuous monitoring and adjustment process, functioning to manage flow in the valve assembly when the overall system is in operation.

In alternative aspects, a choke valve assembly according to the present disclosure can have more than one supplementary choke valve. While systems having a single supplementary choke valve as a secondary choke valve and systems having two supplementary choke valves as a secondary choke valve and a tertiary choke valve are expressly considered herein, this disclosure is applicable to systems having more than two supplementary choke valves operating in concert to manage flow through a primary choke valve. Accordingly, disclosure of a tertiary choke valve can be further understood to be directed toward one or more supplementary choke valves in fluid communication with the valve assembly, in addition to a secondary choke valve.

Figure 6:
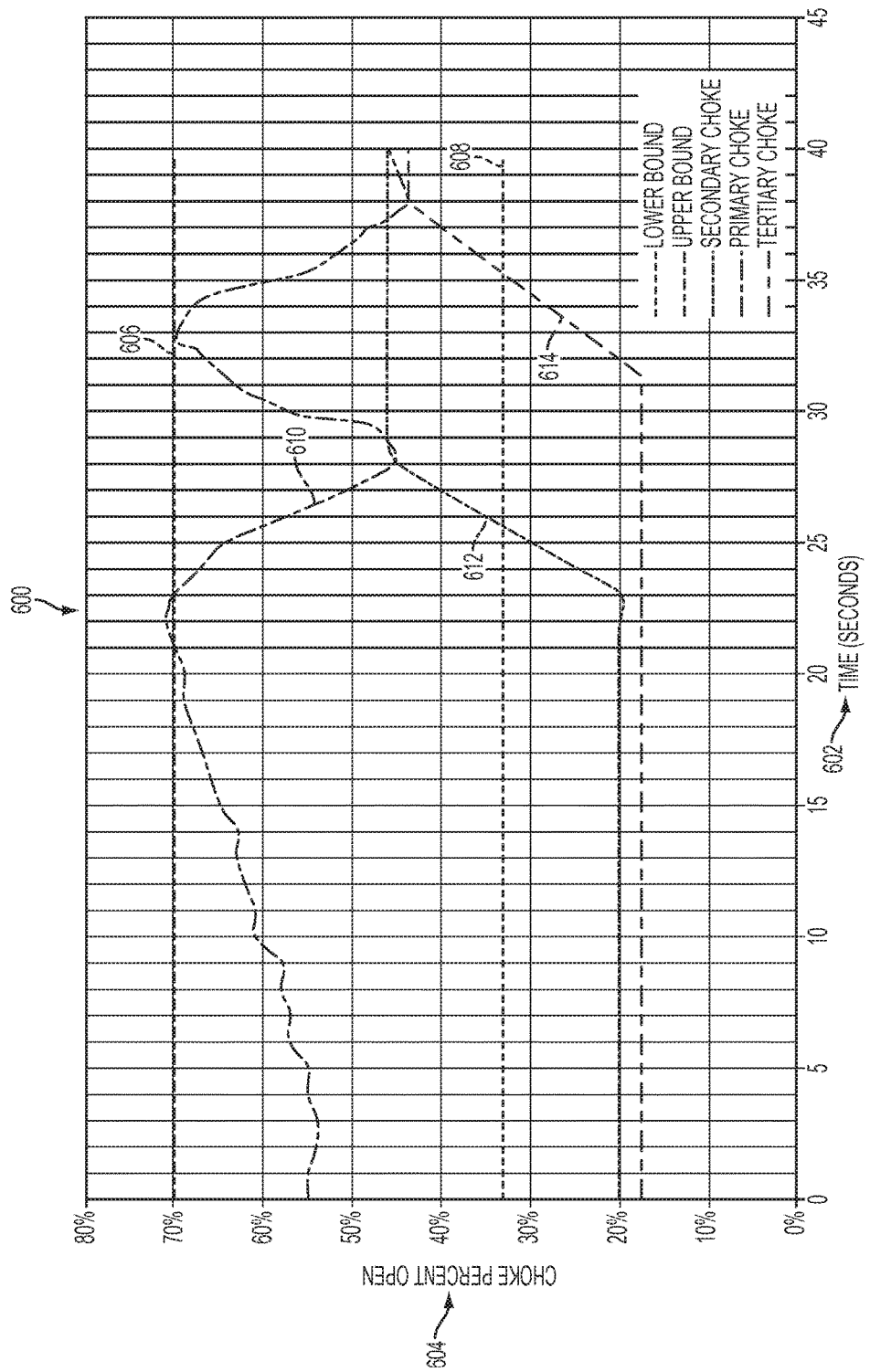
FIG. 6 is a graph illustrating a dynamic interaction between a primary choke valve, a secondary choke valve, and a tertiary choke valve, according to some aspects of the present disclosure.

FIG. 6 is a graph 600 illustrating a dynamic interaction between a primary choke valve, a secondary choke valve, and a tertiary choke valve. The graph 600 displays a relationship between the primary choke, secondary choke, and tertiary in a choke valve assembly over time 602 (on the horizontal axis), particularly the degree to which each of the primary choke, the secondary choke, and the tertiary choke are open, measured as a percentage openness 604 (on the vertical axis). Any one or each of the primary choke, secondary choke, and the tertiary choke, can be ideally operable within an ideal range, defined by an upper range bound and a lower range bound (alternatively referred to as a limit). As shown in FIG. 6, a choke valve can have an upper range bound 606 and a lower range bound 608 for the ideal operability of the choke valve. The upper range bound 606 and lower range bound 608 can further reflect the controllable range of a choke valve, where when a choke valve is open to a degree greater than about the upper range bound 606 or open to a degree below about the lower range bound 608, the choke valve is not able to maintain a pressure in the well system or at the bottom of a wellbore within a desired range. In some aspects, where the primary choke valve is designed to be operable within the controllable range, the upper range bound 606 can be the primary choke valve being about 70% open and the lower range bound 608 can be the primary choke valve being about 30% open. In other aspects, depending on the structural characteristics of a given choke valve, the upper range bound 606 and lower range bound 608 can be greater or less than the exemplary bounds shown in FIG. 6.

On the graph 600, the degree to which the primary choke is open over time can be shown by the primary choke trace 610, the degree to which the secondary choke is open over time can be shown by the secondary choke trace 612, and the degree to which the tertiary choke is open over time can be shown by the tertiary choke trace 614. As the primary choke opens to a greater degree such that primary choke trace 610 approaches and passes the upper range bound 606, the secondary choke can open to distribute the amount of flow away from the primary choke. Accordingly, as the secondary choke opens, the secondary choke trace 612 can increase. In some aspects, the secondary choke can be about 20% open before reacting to the primary choke trace 610 reaching the upper range bound 606. In other aspects, the secondary choke can be completely closed, or open to some other percentage, before reacting to the primary choke trace 610 reaching the upper range bound 606. As the secondary choke opens to distribute flow away from the primary choke, the secondary choke trace 612 can increase and the primary choke trace 610 can decrease until both are within the range defined by the upper range bound 606 and the lower range bound 608.

In some aspects, opening the secondary may not sufficiently distribute flow through the choke valve assembly to maintain the primary choke within its controllable range, such that the primary choke can open further and again approach the upper range bound 606. In such cases, a tertiary choke can further redistribute fluid flow away from the primary choke. Accordingly, the tertiary choke trace 614 can increase to reflect the degree to which the tertiary choke is open. As the primary choke adjusts to control pressure with the increased flow through the tertiary choke, the primary choke trace 610 can fluctuate around the secondary choke trace 612 and the tertiary choke trace 614 until an equilibrium range is reached for flow through the primary choke, secondary choke, and tertiary choke. As the tertiary choke opens to distribute flow away from the primary choke, the tertiary choke trace 614 can increase and the primary choke trace 610 can decrease until those and the secondary choke trace 612 are all within the range defined by the upper range bound 606 and the lower range bound 608.

In further aspects, where the primary choke trace 610 approaches the lower range bound 608, reflecting the primary choke being closed to a greater degree, either or both of the secondary choke and the tertiary can close to distribute more flow through the primary choke. Accordingly, the secondary choke trace 612 and the tertiary choke trace 614 can decrease.

Aspects of the present disclosure are directed toward a choke valve assembly which can include a primary choke in fluid communication with an outlet, a secondary choke in fluid communication with the primary choke and the outlet, and a control unit operatively coupled to the primary choke and the secondary choke, wherein the control unit is programmed with instructions to automatically adjust the secondary choke to keep a coefficient of flow ($C_V$) of the primary choke within a primary choke controllable range. In some applications, the primary choke can be in fluid communication with both a wellbore and an outlet. In some aspects, when a gas or a fluid within the primary choke drives a primary choke valve coefficient of flow ($C_V$) toward a limit of a primary choke controllable range, the control unit can automatically adjust the secondary choke to keep the $C_V$ the within the primary choke controllable range. In some aspects, the choke valve assembly can further include one or more supplementary choke valves in fluid communication with the wellbore, the control unit being operatively coupled to the one or more supplementary choke valves, where when a gas or a fluid within the primary choke drives the $C_V$ toward a limit of the primary choke controllable range, the control unit automatically adjusts the one or more supplementary choke valves to keep the $C_V$ the within the primary choke controllable range. In other aspects, the choke valve assembly can be coupled to, and in fluid communication with, a drill string deployed in the wellbore, where a flow of drilling return fluid, generated by operation of the drill string, passes through the choke valve assembly at a controlled pressure. In further aspects, the choke valve assembly control unit can be programmed with the primary choke controllable range based on physical characteristics of the primary choke. In similar aspects, the choke valve assembly control unit can be programmed with a secondary choke operational range based on physical characteristics of the secondary choke. In further similar aspects, the choke valve assembly control unit can be programmed with a tertiary choke operational range based on physical characteristics of the tertiary choke. In yet further similar aspects, the choke valve assembly control unit can programmed with one or more supplementary choke valves operational ranges based on physical characteristics of the one or more supplementary choke valves. In some aspects, the choke valve assembly can include a user interface, coupled to the control unit, for either or both of monitoring and controlling the primary choke and the secondary choke. In other aspects, the choke valve assembly can include a user interface coupled to the control unit for any or all of monitoring and controlling the primary choke, secondary choke, tertiary choke, and the one or more supplementary choke valves.

Further aspects of the present disclosure are directed toward a drill string choke valve system, which can include a drill string deployed in a wellbore and a choke valve assembly coupled to, and in fluid communication with, the drill string deployed in the wellbore, where a flow of drilling return fluid generated by operation of the drill string passes through the choke valve assembly at a controlled pressure. The choke valve assembly can include a primary choke in fluid communication with an outlet, a secondary choke in fluid communication with the primary choke and the outlet, and a control unit operatively coupled to the primary choke and the secondary choke, wherein the control unit is programmed with instructions to automatically adjust the secondary choke to keep a coefficient of flow ($C_V$) of the primary choke within a primary choke controllable range. In some aspects, the system control unit can automatically adjust the secondary choke when a gas or a fluid within the primary choke drives the $C_V$ of the primary choke toward a limit of the primary choke controllable range. In other aspects, the system control unit can be programmed with the primary choke controllable range based on physical characteristics of the primary choke. In further aspects, the system control unit can be programmed with a secondary choke operational range based on physical characteristics of the secondary choke. In some aspects, the system can include a user interface coupled to the control unit for either or both of monitoring and controlling the primary choke and the secondary choke. In other aspects, the system can further include one or more supplementary choke valves operatively coupled to the control unit, where the control unit can be further programmed with instructions to automatically adjust the one or more supplementary choke valves to keep the $C_V$ of the primary choke within the primary choke controllable range. In further aspects, the system control unit can automatically adjust the one or more supplementary choke valves when a gas or a fluid within the primary choke drives the $C_V$ toward a limit of the primary choke controllable range. In some aspects, the system control unit can be programmed with one or more supplementary choke valves operational ranges based on physical characteristics of the one or more supplementary choke valves. In further aspects, the user interface coupled to the control unit can be operable for either or both of monitoring and controlling the primary choke, secondary choke, and the one or more supplementary choke valves.

Other aspects of the present disclosure are directed toward a method for controlling a choke valve assembly which can include the steps of: opening a primary choke to allow gas or fluid through the primary choke; monitoring a primary choke valve coefficient of flow ($C_V$) in the primary choke with a control unit; determining if the primary choke $C_V$ is within a controllable range; and automatically adjusting a secondary choke in fluid communication with the primary choke based on the $C_V$ to allow an amount of gas or fluid through the secondary choke in order to maintain or return the primary choke $C_V$ within the controllable range. In some aspects, the method can further include automatically adjusting one or more supplementary choke valves in fluid communication with the primary choke based on the $C_V$ to allow the amount of gas or fluid through the one or more supplementary choke valves in order to maintain or return the primary choke $C_V$ within the controllable range. In other aspects, the method according can further include maintaining a bottom hole pressure in a wellbore through a drill string coupled to and in fluid communication with the primary choke and the secondary choke. In further aspects, the methods can also include maintaining a bottom hole pressure in a wellbore through a drill string coupled to and in fluid communication with the primary choke, the secondary choke, and the one or more supplementary choke valves. In yet further aspects, the method can also include automatically adjusting the secondary choke is performed incrementally, such that the method further includes the steps of: monitoring the primary choke for a set period of time after adjusting the secondary choke; after the set period of time, again determining if the primary choke $C_V$ is within the controllable range, and adjusting the secondary choke until the primary choke $C_V$ is within the controllable range. Similarly, the method can alternatively include automatically adjusting the one or more supplementary choke valves is performed incrementally, such that the method also includes the steps of monitoring the primary choke for a set period of time after adjusting the one or more supplementary choke valves; after the set period of time, again determining if the primary choke $C_V$ is within the controllable range and, adjusting the one or more supplementary choke valves until the primary choke $C_V$ is within the controllable range. In some aspects, the adjustment of the secondary choke is incremental, actuating the secondary choke by a percentage of the total actuating range of the secondary choke over a set time period, until the primary choke $C_V$ is within the controllable range. In some aspects, the adjustment of the tertiary choke is incremental, actuating the tertiary choke by a percentage of the total actuating range of the tertiary choke over a set time period, until the primary choke $C_V$ is within the controllable range. In further aspects, the adjustment of the one or more supplementary choke valves is incremental, actuating the one or more supplementary choke valves by a percentage of the total actuating range of the one or more supplemental choke valves over a set time period, until the primary choke $C_V$ is within the controllable range.

Further aspects of the present disclosure are directed toward a method for controlling a bottom hole pressure in a wellbore, including the steps of: operating a drill string coupled to and in fluid communication with a choke valve assembly; directing drilling fluid from the wellbore though the drill string via return line(s) into the choke valve assembly; actuating a primary choke to allow drilling fluid to flow through the choke valve assembly, the choke valve assembly controlling the fluid flow to apply a consistent backpressure in the wellbore. In some aspects, where the primary choke has a primary choke valve coefficient of flow ($C_V$) that indicates a controllable range of the primary choke, the method can further automatically adjust a secondary choke in fluid communication with the primary choke based on the $C_V$ to allow an amount of gas or fluid through the secondary choke in order to maintain or return the primary choke $C_V$ within the controllable range. In other aspects, where the primary choke has a primary choke valve $C_V$ that indicates a controllable range of the primary choke, the method can further automatically adjusting a tertiary choke in fluid communication with the primary choke based on the $C_V$ to allow an amount of gas or fluid through the tertiary choke in order to maintain or return the primary choke CV within the controllable range. In other aspects, where the primary choke has a primary choke valve $C_V$ that indicates a controllable range of the primary choke, the method can further automatically adjusting a tertiary choke in fluid communication with the primary choke based on the $C_V$ to allow an amount of gas or fluid through the tertiary choke in order to maintain or return the primary choke $C_V$ within the controllable range. In further aspects the method can include adjusting or programming a control unit with parameters to define the primary choke $C_V$, and an operational range of any or all of a secondary choke, a tertiary choke, and one or more supplementary choke valves.

The subject matter of aspects and examples of this patent is described here with specificity to meet statutory requirements, but this description is not necessarily intended to limit the scope of the claims. The claimed subject matter may be embodied in other ways, may include different elements or steps, and may be used in conjunction with other existing or future technologies. Throughout this description for the purposes of explanation, numerous specific details are set forth in order to provide a thorough understanding of examples and aspects of the subject matter disclosed herein. It will be apparent, however, to one skilled in the art that the many examples or aspects may be practiced without some of these specific details. In some instances, structures and devices are shown in diagram or schematic form to avoid obscuring the underlying principles of the described examples or aspects. This description should not be interpreted as implying any particular order or arrangement among or between various steps or elements except when the order of individual steps or arrangement of elements is explicitly described.

With these aspects in mind, it will be apparent from this description that aspects of the described techniques may be embodied, at least in part, in software, hardware, firmware, or any combination thereof. It should also be understood that aspects can employ various computer-implemented functions involving data stored in a data processing system. That is, the techniques may be carried out in a computer or other data processing system in response executing sequences of instructions stored in memory. In various aspects, hardwired circuitry may be used independently, or in combination with software instructions, to implement these techniques. For instance, the described functionality may be performed by specific hardware components, such as a control unit for a choke valve system or assembly, containing hardwired logic for performing operations, or by any combination of custom hardware components and programmed computer components. The techniques described herein are not limited to any specific combination of hardware circuitry and software.

The foregoing description of the disclosure, including illustrated aspects and examples has been presented only for the purpose of illustration and description and is not intended to be exhaustive or to limit the disclosure to the precise forms disclosed. Numerous different modifications, adaptations, and arrangements of the components depicted in the drawings or described above, as well as components and steps not shown or described, are possible. Similarly, some features and subcombinations are useful and may be employed without reference to other features and subcombinations. Examples and aspects of the subject matter have been described for illustrative and not restrictive purposes, and alternative examples or aspects will become apparent to those skilled in the art without departing from the scope of this disclosure. Accordingly, the present subject matter is not limited to the examples or aspects described above or depicted in the drawings, and various embodiments, examples, aspects, and modifications can be made without departing from the scope of the claims below.

That which is claimed is:

1. A choke valve assembly, comprising:
    a primary choke in fluid communication with an outlet;
    a secondary choke in fluid communication with the primary choke and the outlet;
    a tertiary choke in fluid communication with the primary choke, the secondary choke, and the outlet; and
    a control unit operatively coupled to the primary choke, the secondary choke, and the tertiary choke, wherein the control unit is programmed with instructions to automatically and concurrently adjust the primary choke, the secondary choke, and the tertiary choke in concert with each other to keep a coefficient of flow ($C_V$) of the primary choke within a primary choke controllable range.

2. The choke valve assembly according to claim 1, wherein the control unit automatically adjusts the secondary choke when a gas or a fluid within the primary choke drives the $C_V$ of the primary choke toward a limit of the primary choke controllable range.

3. The choke valve assembly according to claim 1, wherein the control unit is programmed with the primary choke controllable range based on physical characteristics of the primary choke.

4. The choke valve assembly according to claim 1, wherein the control unit is programmed with a secondary choke operational range based on physical characteristics of the secondary choke.

5. The choke valve assembly according to claim 1, further comprising a user interface coupled to the control unit for either or both of monitoring and controlling the primary choke, the secondary choke, and the tertiary choke.

6. The choke valve assembly according to claim 1, wherein the control unit automatically adjusts the tertiary choke when a gas or a fluid within the primary choke drives the $C_V$ toward a limit of the primary choke controllable range.

7. The choke valve assembly according to claim 1, wherein the control unit is programmed with a tertiary choke operational range based on physical characteristics of the tertiary choke.

8. The choke valve assembly according to claim 1, wherein the secondary choke and the tertiary choke are each configured to each have a different sensory trigger than the primary choke.

9. The choke valve assembly according to claim 1, wherein the secondary choke and the tertiary choke are each configured to each have different sensory triggers from each other.

10. A drill string choke valve system, comprising:
a drill string deployed in a wellbore;
a choke valve assembly coupled to and in fluid communication with the drill string deployed in the wellbore, wherein a flow of drilling return fluid generated by operation of the drill string passes through the choke valve assembly at a controlled pressure, the choke valve assembly comprising:
a primary choke in fluid communication with an outlet;
a secondary choke in fluid communication with the primary choke and the outlet; and
a control unit operatively coupled to the primary choke and the secondary choke, wherein the control unit is programmed with instructions to automatically and concurrently adjust the primary choke and the secondary choke in concert with each other to keep a coefficient of flow ($C_V$) of the primary choke within a primary choke controllable range.

11. The system according to claim 10, wherein the control unit automatically adjusts the secondary choke when a gas or a fluid within the primary choke drives the $C_V$ of the primary choke toward a limit of the primary choke controllable range.

12. The system according to claim 10, wherein the control unit is programmed with the primary choke controllable range based on physical characteristics of the primary choke.

13. The system according to claim 10, wherein the control unit is programmed with a secondary choke operational range based on physical characteristics of the secondary choke.

14. The system according to claim 10, further comprising a user interface coupled to the control unit for either or both of monitoring and controlling the primary choke and the secondary choke.

15. The system according to claim 10, further comprising one or more supplementary choke valves in fluid communication with the primary choke and operatively coupled to the control unit, wherein the control unit is further programmed with instructions to automatically and concurrently adjust the one or more supplementary choke valves to keep the $C_V$ of the primary choke within the primary choke controllable range.

16. The system according to claim 15, wherein the control unit is programmed with one or more supplementary choke valves operational ranges based on physical characteristics of the one or more supplementary choke valves.

17. The system according to claim 15, further comprising a user interface coupled to the control unit for either or both of monitoring and controlling the primary choke, the secondary choke, and the one or more supplementary choke valves.

18. A method for controlling a choke valve assembly, comprising:
opening a primary choke to allow gas or fluid flow through the primary choke;
opening a secondary choke to allow gas or fluid flow through the secondary choke;
monitoring a primary choke coefficient of flow ($C_V$) in the primary choke with a control unit;
determining if the primary choke $C_V$ is within a controllable range; and
automatically adjusting the secondary choke in fluid communication with the primary choke, concurrently with the primary choke, based on the primary choke $C_V$ to allow an amount of gas or fluid to flow through the secondary choke in order to maintain or return the primary choke $C_V$ within the controllable range.

19. The method according to claim 18, further comprising maintaining a bottom hole pressure in a wellbore through a drill string coupled to and in fluid communication with the primary choke and the secondary choke.

20. The method according to claim 18, wherein automatically adjusting the secondary choke concurrently with the primary choke is an incremental adjustment, such that the method further comprises:
monitoring the primary choke for a set period of time after adjusting the secondary choke;
after the set period of time, again determining if the primary choke $C_V$ is within the controllable range; and
adjusting the secondary choke until the primary choke $C_V$ is within the controllable range.

21. The method according to claim 18, further comprising actuating the secondary choke by a percentage of a total actuating range of the secondary choke over a set time period until the primary choke $C_V$ is within the controllable range.

22. The method according to claim 18, further comprising automatically adjusting one or more supplementary choke valves in fluid communication with the primary choke and the secondary choke, concurrently with the primary choke and the secondary choke, based on the primary choke $C_V$ to allow the amount of gas or fluid to flow through the one or more supplementary choke valves in order to maintain or return the primary choke $C_V$ within the controllable range.

23. The method according to claim 22, further comprising maintaining a bottom hole pressure in a wellbore through the drill string coupled to and in fluid communication with the primary choke, the secondary choke, and the one or more supplementary choke valves.

24. The method according to claim 22, wherein automatically adjusting the one or more supplementary choke valves is an incremental adjustment, such that the method further comprises:
monitoring the primary choke for a set period of time after adjusting the one or more supplementary choke valves;
after the set period of time, again determining if the primary choke $C_V$ is within the controllable range; and adjusting the one or more supplementary choke valves until the primary choke $C_V$ is within the controllable range.

25. The method according to claim 22, wherein adjustment of the one or more supplementary choke valves is incremental, actuating the one or more supplementary choke valves by a percentage of a total actuating range of the one or more supplemental choke valves over a set time period, until the primary choke $C_V$ is within the controllable range.

26. The method according to claim 22, further comprising:
   operating the choke valve assembly to apply a consistent backpressure in a wellbore; and
   adjusting or programming a control unit with parameters to define the primary choke $C_V$, and an operational range of the secondary choke and the one or more supplemental choke valves.

* * * * *